Patented Jan. 6, 1948

2,433,833

UNITED STATES PATENT OFFICE 2,433,833

FLATTING AGENT AND PROCESS FOR MAKING SAME

Laszlo Auer, South Orange, N. J.

No Drawing. Application November 24, 1944,
Serial No. 565,043

12 Claims. (Cl. 260—30)

OBJECT AND GENERAL OUTLINE OF INVENTION

This invention relates to organic flatting agents for use in preparation of flat (dull, matte) coating compositions, and to the compositions and finished articles containing said flatting agents. More particularly this invention is directed to the production of organic flatting agents of the metal resinate type, having unusual flatting power under adverse conditions of application. The metal resinate is obtained by precipitation and the pigment size particles of same are coated with a water-insoluble metal salt of carboxy-methylcellulose.

While many protective and decorative finishes are glossy, it is often desired to obtain finishes which are more or less flat, either for decorative effects (as in furniture finishes) or for utilitarian purposes (as in finishes for army equipment), where a non-reflecting surface is desired. A flat effect can be obtained by the use of very high percentages of pigments, in the case of pigmented coating compositions, but even in this event requirements of film properties, such as elasticity, durability, flexibility, may exclude the possibility of achieving a flatting action by the use of excessive pigmentation. In the case of transparent finishes, of course, pigmentation cannot serve to achieve a flatting effect, as pigments would obscure the transparency of the resulting film.

If pigmentation could not be used, it was customary to obtain flatting action by incompatibility of film forming solids, or by application of powdery flatting agents. Because of unusual complications caused by using the former, the latter is more frequently used.

The trade in general has adopted the use of powders which are relatively insoluble in the coating compositions, and which can be dispersed therein to yield films which are transparent because of the similarity in refractive index between the flatting agents and the film-forming solids, and are flat because of the fact that the insoluble flatting agents break up the light reaching the surface of the film. The flatting agents generally employed fall into two classes—inorganic transparent inert pigments, and organic flatting agents.

The common inorganic inerts are siliceous materials, such as infusorial earth, silica, silica gel, some talcs, etc. They are essentially pigments capable of staying on the surface of coatings while wet and during film, and which are transparent because their refractive indices approach those of the vehicles, and which are able to produce effective flatting because of the uneven surface so formed. They have three principal disadvantages. First, they are never perfectly transparent when a film of very low reflectivity is wanted. Second, they settle very badly to hard dry cakes upon storage. However, this appears to be a property associated with their particle size and shape. Finally, the films produced are essentially pigmented films, so that where high flexibility is desired, as in artificial leather, the films are unsatisfactory because they craze on flexing.

The common organic flatting agents comprise certain transparent uncolored heavy metal soaps (magnesium, the alkali earths, zinc and aluminum soaps of fatty acids) and the waxes. These materials generally produce more transparent films than the inorganic flatting agents, since they are more nearly similar in refractive index to the film-forming agents. Furthermore, because of their low specific gravity, and because of their similarity in general constitution to the vehicles, they stay in suspension better, settling into flocculates which are easily stirred back into uniform dispersions. Because of these advantages, they are preferred for transparent interior finishes and the like. They have, however, certain marked disadvantages. While they do not weaken a film as badly as the inerts, films containing these agents also show crazing when flexed, as on artificial leather, except in the case of the most soluble soaps, which are extremely difficult to handle. Certain of the soaps hydrolyze when the films are exposed to water, causing an objectionable whitening of the films. Finally, the waxes and soaps are all more or less soluble in hydrocarbon solvents, particularly at elevated temperatures, thereby suffering loss of flatness. Also improper milling, resulting in high temperature, will cause loss of flatting power. These flat materials cannot be used in finishes designed to be dried at elevated temperatures. The metallic soaps of fatty acids are sensitive to humidity and may cause great delay in drying of the films, as well in varnishes as in lacquers, and the films formed in humidity have a cheesy appearance.

In my past investigations I have found, that flatting agents of the metallic resinate type have great advantages over other flatting agents, when used in coating compositions. However even these resinate type flatting agents cause frequently trouble by being partially or fully soluble in solvents used in coating compositions, or in some of their ingredients, forming their solids, such as in resins, fatty oils, plasticizers or cellulose derivatives. Such solubility may cause bodying or even gelation of the coating compositions. In other cases varying solubility causes varying flatting action and in general: solubility causes reduction of flatting power. A baking operation or even forced drying at somewhat elevated temperatures increases solubility and decreases flatting action.

I have invented an organic flatting agent of the metallic soap type which retains the transparency and non-settling characteristics of this type of flatting agent, and at the same time is resistant to hydrolysis, is sufficiently compatible with nitrocellulose films so that crazing on artificial leather is eliminated, and is considerably less soluble than the ordinary soaps used as flatting agents. In the preferred form of my invention, the solubility is so lessened that the flat material can be used in many baking finishes. This new material comprises a soap of rosin, the melting point of which has been increased by some reaction (e. g., hydrogenation, combination with phenolaldehyde resin, the Diels-Alder reaction with maleic anhydride, etc.), with a heavy metal of the group consisting of the alkali earth metals, magnesium, zinc and aluminum, in the form of a powder of pigment particle size, the individual particles of which are coated with a water-insoluble metal salt of carboxy-methylcellulose. Salts of carboxy-methylcellulose are insoluble in organic solvents and render the resin soap particles (coated therewith) inert to their solubilizing action.

Coated soaps of the maleic adduct of rosin are especially useful in finishes which are hardened by baking.

The coating used herein, to coat the soap particles has unique properties by being not only insoluble in organic solvents, but by also being insoluble in water and even in many cases in alkaline solutions. This property causes improvement in the weathering properties of films containing the improved flatting agent and improvement in washability, water resistance and alkali resistance of such films.

The powdered coated soap may be dispersed in oil, oleo-resinous, resinous, cellulose derivatives, rubber and other film-forming compositions, by the use of ordinary dispersion machinery. The resultant films are more or less flat, depending on the percentage of flatting agent added; the flatting effect per unit weight compares favorably with that of the ordinary metallic soaps. However, the films are unique in that the toughness of the original glossy film is more nearly approximated than with ordinary soaps.

BASE RESIN AND PREPARATION OF THE RESIN SOAP

Whereas natural rosin, such as wood rosin and gum rosin may be used in this process as base material to form the resinate, resins which contain rosin but have increased melting point, when compared to natural rosin, are preferred. I have found that increased melting point and hardness reduce solubility of the resinates in organic solvents and this is advantageous in the present process.

Treated rosins, which may be used in this process, are e. g., hydrogenated rosin, rosin condensed with maleic anhydride, or another acid having the

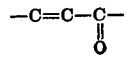

structure necessary for the maleic type reaction with rosin (e. g., fumaric acid, citraconic and itaconic anhydride or acid), phenol-formaldehyde treated rosin, or rosins treated with any other combination of these processes. It is important that during the reaction of increasing the melting point of rosin its acidity should be preserved as the acids are forming the soaps of this process.

Acidic resins or resin acids suitable for the process of this specification include any of the rosin acids present in natural rosin, further the acids of other natural resins (e. g., of fossil resins, like copals) in their natural form or in their known treated forms, such as isomerized rosin acids, disproportionated rosin acids, polymerized rosin acids and molecularly rearranged rosin acids, and fused congo resin acids.

To prepare the precipitated resinate, it is necessary as a first step to saponify the acidic resin, to form a water soluble soap and a water solution of such soap. Sodium, potassium and ammonium resinates are examples of such water soluble soaps. In a subsequent step the water-insoluble resinate is precipitated, by reacting the water soluble resin soap with a water solution of a water soluble salt of the metal forming the water-insoluble resinate. Aluminum, zinc, magnesium and alkali earth metal resinates may be prepared according to this process.

COATING PROCESS

The precipitated resinate particles are coated according to the present process with a water-insoluble salt of carboxy-methylcellulose. Carboxy-methylcellulose is marketed in the form of a sodium salt and as starting material in this process the sodium salt is suitable. However, any other water soluble salt of carboxy-methylcellulose may be used, such as ammonium or potassium carboxy-methylcellulose. A water solution is prepared first from the water soluble salt of the carboxy-methylcellulose. Sodium carboxy-methylcellulose is marketed in various viscosity ranges such as low, medium and high viscosities and for the purposes of this invention I may use any of the viscosity ranges. For various purposes various viscosities may be advantageous. In the illustrated examples further above, medium viscosity sodium carboxy-methylcellulose was used, wherever 1% coating was produced, whereas when a higher percentage coating was produced, low viscosity sodium carboxy-methylcellulose was applied.

The low viscosity type of sodium carboxy-methylcellulose in a 2% solution shows a viscosity of 25 to 50 cps., whereas the medium viscosity type shows under equal conditions 400 to 600 cps. and the high viscosity grade about 1500 cps. in a 1% solution.

From the aqueous solution of the water soluble carboxy-methylcellulose salt, the water-insoluble salt is prepared by reacting the former with a water soluble salt of the heavy metal, such as for instance, aluminum sulfate, aluminum acetate, barium nitrate, stannous chloride, basic lead acetate, ferric chloride, ferrous sulfate, etc. I prefer to use in my process a salt of aluminum, magnesium, zinc, or of an alkali earth metal, or of lead. The lead carboxy-methylcellulose has the advantage over some of the others, that it will produce a salt, which is insoluble in alkali, whereas some of the others may be attacked and redissolved by alkalies.

The quantity of the salt coating may vary from

¼% to about 20%, or even somewhat lower or somewhat higher to accomplish some special result. In most cases, however, from about ½% to about 10% will yield the desired results. All percentages here mentioned are based on the quantity of metal resinate coated.

The coating of the metal resinate particles may be performed essentially by two methods:

(1) Co-precipitation of the water-insoluble metal resinate and the water-insoluble carboxy-methyl-cellulose salt.

(2) Precipitation of the water-insoluble carboxy-methyl-cellulose salt on the pre-formed precipitated metal resinate.

ILLUSTRATIVE EXAMPLES

To illustrate this invention the surface-coating of the resin soap particles is demonstrated here below by using sodium carboxy-methylcellulose. It should be understood, that the selection of materials used in the illustrative examples has been made to illustrate the process and not to limit same.

EXAMPLE 1

Preparation of base resin

| | Pounds |
|---|---|
| N Wood rosin | 300 |
| Maleic anhydride | 54 |

The materials were place in a 200 gallon aluminum kettle, and heated to about 200° C. in 30 to 60 minutes. The batch was held at 200° C. for about 30 minutes, raised to 245° C. in about 30 minutes, and held for completion of the reaction for about 30 minutes. The melt was cast at about 180° C., and broken up. The acid number of the resin was 229 and the melting point was 115° C.

The resin was then made into a soluble soap, and precipitated with a salt of a heavy metal. A typical procedure is as follows:

Preparation of flatting agent

Thirty pounds of the base resin were saponified with 9 pounds of sodium hydroxide in 25 gallons of water, at the boil. A solution of 3 pounds of sodium carboxy-methylcellulose (low viscosity) was prepared in 36 gallons of cold water (60° F.). This was added to the soap solution, also at 60° F. To this cold solution was added a precipitating solution of aluminum sulfate, also cold, made by dissolving 28 pounds of aluminum sulfate in 6½ gallons of water. This was a slight excess of aluminum sulfate over theoretical. The two solutions were mixed with constant agitation, adding the aluminum sulfate solution gradually until the solution was acid to litmus, at which stage further addition of the aluminum sulfate solution was stopped. The mixture was then boiled for 10 minutes to complete the coprecipitation; it was then filtered, washed free of sulfate ions and dried at 160° F. (to prevent spontaneous combustion which may occur at higher temperatures). It may be advisable to grind the dried product, to separate the pigment size particles. The resultant powdery product was ready for incorporation in a coating composition.

EXAMPLE 2

Example 1 was repeated, by using 36 pounds of maleic anhydride and 300 pounds of rosin in making the base resin. The reaction conditions were otherwise unchanged. The resulting product was a flatting agent with somewhat higher solubility characteristics in organic solvents than the flatting agent made according to Example 1.

Instead of decreasing the proportion of maleic anhydride to rosin, the same may be also further increased.

EXAMPLE 3

Example 1 was repeated, using the same base resin but using only half of the sodium hydroxide solution for the saponification of the full amount of the base resin (30 pounds) and also using half of the aluminum sulfate. The resulting flatting agent had the same proportion of maleic anhydride and rosin as in Example 1, but the aluminum content of the flatting agent was reduced, thereby decreasing the flatting power and increasing the solubility in organic solvents.

Besides changes in proportions of maleic anhydride, sodium hydroxide and aluminum sulfate with respect to the rosin, the physical properties of the products may be slightly modified by heating the mixture to different temperatures in making the base resin or in precipitating the coated aluminum soap of the base resin. Also, other water-soluble aluminum salts may be used instead of aluminum sulfate for the precipitation, e. g., aluminum acetate.

Zinc, magnesium and alkali earth metals may also be used in place of aluminum to produce the insoluble soaps, by using water soluble salts of these metals, to replace the aluminum salts in the above examples.

EXAMPLE 4

Preparation of base resin

| | Parts |
|---|---|
| N Wood rosin | 100 |
| Phenol-formaldehyde A-stage resin, liquid | 12 |

The N Wood rosin was heated to 400° F. and the A-stage resin added gradually, reheating the mixture to 400° F. each time and holding the mixture at 400° F. until the foam sets. Between addition of the different portions of the A-stage resin, it is advisable to wait until the foaming stops before adding the next portion. After all the A-stage resin has been added, the mixture was heated slowly to 475° F. and held for one hour, cooled to 350° F. and discharged.

Preparation of flatting agent

The procedure was the same as that described in Example 1.

Variations

Instead of a liquid A-stage phenol-formaldehyde resin, a rosin-soluble, solid condensation product of an alkyl-substituted phenol and formaldehyde, such as resin made from p-tertiary-butyl-phenol or p-tertiary-amyl-phenol, may be used.

In making the base resin of this example the proportions of rosin to phenolic resin may be changed, as well as the reaction temperature. Also other rosin reactive phenolic resins may be incorporated.

EXAMPLE 5

Preparation of filter cake

In this example as base resin a phenol-formaldehyde modified rosin product was used, containing between 12 to 14% phenol-formaldehyde content and having an acid value of 140 and a melting point of 140° C., measured according to the mercury method.

1,000 grams of base resin, 7,000 grams of water and 200 grams of sodium hydroxide were used to prepare the soap solution. The water and the sodium hydroxide were heated first to boiling and then the crushed resin was added gradually and the mixture was kept at boiling temperature for about 20 minutes, within which time the resin was completely saponified. 8,000 grams of additional water were added. The mixture at this stage was turbid but when heated to a temperature of 70° C., the solution cleared up. The mixture was brought to boiling temperature. A solution of 570 grams of aluminum sulfate in 840 grams of water was prepared and this solution was brought to boiling temperature. The aluminum sulfate solution was gradually added to the sodium resinate solution, until the resulting slurry reacted slightly acid to litmus paper, at which stage the addition of the aluminum sulfate was stopped. The mixture was further boiled for 15 to 20 minutes. The resulting aluminum resinate was washed by decantation until the wash water showed a sulfate ion reaction of not more than 25 parts in a million parts. Approximately 40 gallons of water were needed for this purpose. The aqueous slurry of the aluminum resinate was put through a filter press and the water content of the resulting filter cake was established, showing 75% of water and 25% of resinate.

Preparation of flatting agent 400 grams of the above wet filter cake and 1,000 grams of additional water were brought to boil while employing constant agitation. The suspension so obtained, contained about 100 grams of dry aluminum resinate. To the boiling suspension 50 grams of a 2% strong aqueous sodium carboxy-methylcellulose solution (medium viscosity) were added while keeping the mixture at the boiling temperature. 20 grams of a 5% strong aqueous solution of basic lead acetate were added under agitation, and the mixture was kept near the boiling point for about 15 minutes. The mixture was then transferred to a 2 gallon vessel and washed 6 times with 2 gallons of hot water, to wash the precipitate and the wash water was separated by decantation. The product was filtered, dried at 170° F., and was ready to be used in preparing a paste of the flatting agent, by grinding same in a pebble mill with 3 times of its weight of mineral spirits. Such paste can be directly added to varnishes to obtain flatting action.

The flatting agent prepared according to this example, shows the surface coating of an already precipitated aluminum resinate with the lead salt of carboxy-methylcellulose. The flatting agent so obtained shows very good alkali resistance in varnish films, which themselves have fair alkali resistance in the absence of the flatting agent. Other common flatting agents reduce the alkali resistance of such varnish films.

The water content of the flatting agent in the drying process should be kept below 1% and preferably in a range not exceeding much ½%. This applies to the other examples of this specification also.

Example 6

This example was a repeat of Example 5, with the only difference that for precipitation of the sodium carboxy-methylcellulose, 20 grams of a 5% strong aqueous aluminum sulfate solution was used instead of the similar quantity of basic lead acetate solution, used in the preceding example.

Example 7

Co-precipitation process 100 grams of the acidic base resin, used in Examples 5 and 6, were saponified with 20 grams of sodium hydroxide, dissolved in 700 grams of water. After the saponification was completed, further 750 grams of water were added and the mixture was brought to boil. 50 grams of a 2% strong aqueous solution of sodium carboxy-methylcellulose was then added and the mixture brought back to boiling temperature. 60 grams of aluminum sulfate were then dissolved in 90 grams of water, and the solution was brought to boiling temperature. Under constant agitation, the aluminum sulfate solution was slowly and gradually added to the sodium resinate solution, containing the sodium carboxy-methylcellulose. This addition was continued, until the mixture turned slightly acid, when tested by litmus paper. Out of the 150 grams of aluminum sulfate solution prepared about 142 grams was needed to accomplish this effect. The resulting pH was 5. The precipitate was washed by decantation, until free of sulfate ions, was filtered on a filter press, dried and was ready for use as flatting agent. This example shows the co-precipitation of the aluminum resinate and of the aluminum salt of carboxy-methylcellulose.

Example 8

Example 7 was repeated, using however 500 grams of the 2% strong aqueous sodium carboxy-methylcellulose solution. The required quantity of the aluminum sulfate solution, of the same strength as used in Example 7, was somewhat higher, than in Example 7, to bring the pH of the slurry to 5. The reason is that whereas in Example 7, 1% sodium-carboxy-methylcellulose was used to form the corresponding aluminum salt, based on the base resin quantity, in the present example, 10 times of that quantity, i. e., 10% sodium carboxy-methylcellulose was used. This increased quantity required increased proportion of the aluminum sulfate to react to form the aluminum salt of the carboxy-methylcellulose.

Example 9

100 grams of the acidic base resin, used in Example 7, were saponified with 20 grams sodium hydroxide, dissolved in 700 grams of water. After the saponification was completed, further 750 grams of water were added and the mixture was brought to boil. This mixture was then precipitated with an aqueous solution of aluminum acetate. A solution was used, which contained aluminum acetate equivalent to 7% $Al_2O_3$ in 100 parts of solution by weight. The aluminum acetate was slowly added to the boiling mixture and the addition was continued until the mixture turned very slightly acid. The slurry was kept at boiling temperature and agitated vigorously all the time. A small trace of a dilute sodium hydroxide solution was then added, to bring back the pH to about 7 or 7.1. 50 grams of a 2% strong aqueous solution of sodium carboxy-methyl-cellulose were then added and the mixture brought back to boiling temperature. 20 parts of a 5% strong basic lead acetate solution (aqueous) were slowly added under constant agitation to the slurry, precipitating on the surface of the aluminum resinate the lead salt of carboxy-methyl-cellulose. The mixture was boiled for 15 minutes, filtered and washed free of sodium acetate and excessive basic lead acetate. As soon as the washing was completed, the filter cake was broken up and dried to a moisture content of about ½%.

The resulting product demonstrates the procedure how the aluminum resinate particles may be surface coated, without previously washing same. The product is somewhat similar to the product of Example 5. However, because aluminum acetate was used for the precipitation, it was not necessary to wash the resinate before coating its particles with the lead salt of carboxymethylcellulose.

EXAMPLE 10

Flat varnishes, lacquers and other coatings may be prepared with flatting agents made according to the present invention. A few examples are given herewith, to show typical proportions of flatting agent used to get a film with reduced sheen:

A. Lacquers:

| | Per cent by weight |
|---|---|
| Flatting agent | 6 |
| Nitrocellulose | 12 |
| Damar resin | 6 |
| Tricresyl phosphate | 4 |
| Solvent consisting of 60% toluol, 20% ethyl acetate, 10% butyl acetate and 10% butanol | 72 |

B. Varnishes:

| | |
|---|---|
| Flatting agent | 7 |
| 8 gal. long China-wood oil-modified phenolic varnish base | 25 |
| Mineral spirits | 68 |

C. Alkyd-urea varnish:

| | |
|---|---|
| Flatting agent | 7 |
| A glyceryl phthalate resin modified with 35% of soya bean oil | 17½ |
| A butanol-soluble urea-formaldehyde resin | 17½ |
| Solvesso #2 (hydrogenated petroleum naphthas boiling between 135° C. and 177° C.) | 40 |
| Butanol | 10 |
| Xylol | 8 |

D. Artificial leather coating:

| | |
|---|---|
| Flatting agent | 7 |
| Five second nitrocellulose | 10.5 |
| Tricresyl phosphate | 13.5 |
| Solvent mixture consisting of ½ ethyl ethyl acetate and ½ ethyl alcohol | 69 |

If desired, rosin compounds which are capable of being saponified (e. g., ester gum) may be substituted for the rosin in the preparation of these flatting agents.

The incorporation of the flatting agent into the various vehicles may be carried out either by preparing a concentrated paste of the flatting agent in the vehicle or in a solvent mixture, and then diluting the paste by the addition of further vehicle quantities; or the incorporation may be carried out in a single operation by grinding the flatting agent directly into the vehicle in the final proportions. The grinding may be carried out in pebble mills, roller mills, or with the aid of other suitable equipment.

The above examples are illustrations of the different embodiments of the present invention, and should not be considered as limiting its scope.

Whereas this specification is primarily directed to certain metal resinates, the particles of which are coated with a film of a water insoluble metal salt of carboxy-methylcellulose, I have found that the heavy metal salts of carboxy-methylcellulose, when applied in powder form, exercise flatting action when incorporated into varnish and lacquer films.

I claim:

1. A new composition of matter useful as a flatting agent which is substantially transparent in conventional lacquer and varnish films which comprises pigment size particles of a soap of a metal of a class consisting of aluminum, zinc, magnesium and the alkali earth metals, and a resin acid of the class consisting of natural rosin acids, acids of fossil resins and acids of rosin which has been modified by chemical reaction to increase its melting point while leaving its carboxyl group free to form soaps, coated with a water insoluble metal salt of carboxy-methylcellulose, said salt also being insoluble in organic varnish and lacquer solvents, said carboxymethylcellulose forming water soluble sodium salts.

2. The composition of claim 1, in which the melting point of the rosin has been increased by hydrogenation.

3. The composition of claim 1, in which the rosin has been modified with an alpha-olefinic dibasic acid, to increase its melting point.

4. The composition of claim 1, in which the melting point of the rosin has been increased by reacting rosin with a phenol-aldehyde condensation product.

5. The composition of claim 1, in which the coating consists of the aluminum salt of carboxymethylcellulose.

6. The composition of claim 1, in which the coating consists of the lead salt of carboxymethylcellulose.

7. A coating composition which dries to a substantially transparent dull or flat surface, which comprises a normally glossy drying non-aqueous organic film-forming vehicle containing hydrocarbon solvents, the films of which are flattened by the incorporation therein of pigment size particles of a soap of a metal of the class consisting of aluminum, zinc, magnesium and the alkali earth metals, and a resin acid of the class consisting of natural rosin acids, acids of fossil resins and acids of rosin which has been modified by chemical reaction to increase its melting point while leaving its carboxyl group free to form soaps coated with a film consisting of a water insoluble metal salt of carboxy-methylcellulose, said salt also being insoluble in liquid hydrocarbon solvents, said carboxy-methylcellulose forming water soluble sodium salts.

8. A process for making flatting agents which are substantially transparent in conventional lacquer and varnish films, which comprises saponifying a resin acid of the class consisting of natural rosin acids, acids of fossil resins and acids of rosin which has been modified by chemical reaction to increase its melting point while leaving its carboxyl group free to form soaps, forming thereby an aqueous soap solution thereof, precipitating a water insoluble soap by the addition of a soluble salt of a metal of the class consisting of aluminum, magnesium, zinc, and alkali earth metals, coating the particles of the precipitated soap by depositing a film thereon consisting of a water insoluble metal salt of carboxy-methylcellulose, which said salt is insoluble in liquid hydrocarbon solvents, and recovering the coated soap, said carboxy-methylcellulose forming water soluble sodium salts.

9. A process for making flatting agents which are substantially transparent in conventional lacquer and varnish films, which comprises reacting rosin to raise its melting point without attacking the carboxyl group therein, forming an aqueous soap solution thereof, mixing said soap solution with a water solution of a water soluble salt of carboxy-methylcellulose and co-precipitating a water insoluble resin soap and a water insoluble salt of carboxy-methylcellulose by the addition of a soluble salt of a metal of the class consisting of aluminum, magnesium, zinc, and alkali earth metals.

10. A process for making flatting agents which are substantially transparent in conventional lacquer and varnish films, which comprises saponifying a resin acid of the class consisting of natural rosin acids, acids of fossile resins and acids of rosin which has been modified by chemical reaction to increase its melting point while leaving its carboxyl group free to form soaps, forming thereby an aqueous soap solution thereof, mixing said soap solution with a water solution of a water soluble salt of carboxy-methylcellulose and co-precipitating a water insoluble resin soap and a water insoluble salt of carboxymethylcellulose by the addition of a soluble salt of a metal of the class consisting of aluminum, magnesium, zinc, and alkali earth metals.

11. A process according to claim 8, in which the lead salt of carboxy-methylcellulose is used to coat the particles of the precipitated resin soap.

12. A process according to claim 9, in which the aluminum salt of carboxy-methylcellulose is produced in the co-precipitation process.

LASZLO AUER.

REFERENCES CITED

The following references are of record in the file of this patent:

UNITED STATES PATENTS

| Number | Name | Date |
|---|---|---|
| 2,190,445 | Ellsworth | Feb. 13, 1940 |
| 2,231,468 | Hanahan | Feb. 11, 1941 |
| 2,363,489 | Auer | Nov. 28, 1944 |

OTHER REFERENCES

"Hercules Sodium Carboxymethylcellulose," Hercules Powder Co., Wilmington, Del., June, 1944, page 2.